March 5, 1940.   W. N. MEEKS   2,192,478
PIPE CLAMP
Filed May 4, 1939
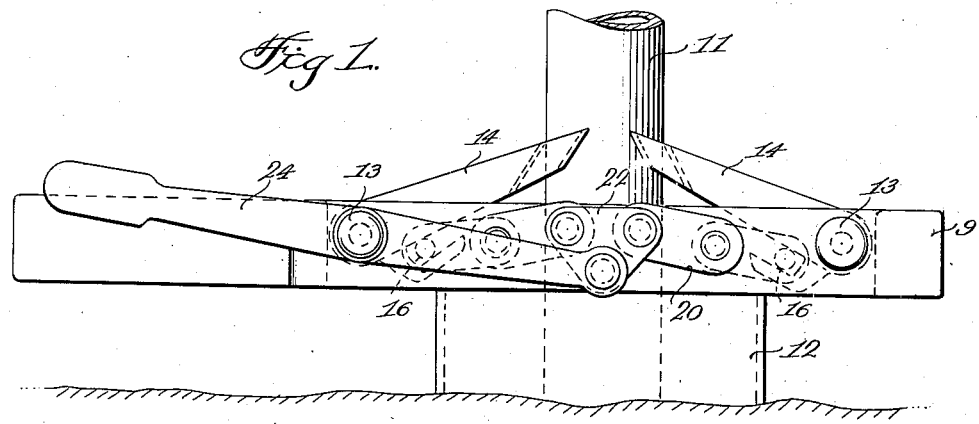
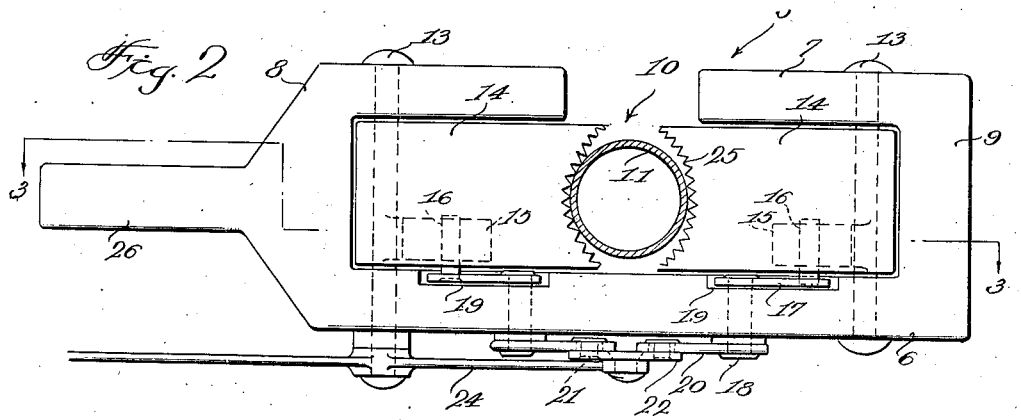
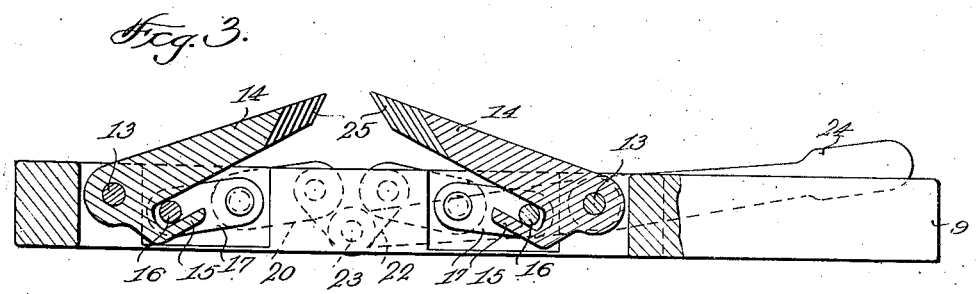
William N. Meeks
INVENTOR
BY Victor J. Evans & Co.
ATTORNEYS Patented Mar. 5, 1940

2,192,478

UNITED STATES PATENT OFFICE 2,192,478

PIPE CLAMP

William N. Meeks, Ashdown, Ark.

Application May 4, 1939, Serial No. 271,783

2 Claims. (Cl. 24—249)

My invention relates to pipe clamps and the like and has as one of the principal objects thereof the provision of a simple and durable device for obtaining a positive grip upon a pipe or rod whereby said pipe or rod may be easily moved, either manually or by attaching a suitable hoisting mechanism to the pipe or rod.

Another object of my invention is to provide a device of the above described character capable of accommodating pipes or rods of various sizes and which automatically adjusts itself to the size of the pipe or rod being worked upon.

A further object of my invention is to provide a device of the above described character which is efficient in operation and economical in manufacture.

Other objects and advantages will be apparent from the following description, appended claims and annexed drawing.

Referring to the drawing wherein like reference characters designate like parts throughout the several views:

Figure 1 is a side elevation of my invention illustrating the same in connection with a length of pipe.

Figure 2 is a top plan view thereof, the pipe being illustrated in section.

Figure 3 is a sectional view taken on the line 3—3 of Figure 2.

In practicing my invention, in a preferred embodiment illustrated in the drawing, I provide a frame 5 having side walls 6 and 7 and end walls 8 and 9 connecting said side walls together in spaced relation and coacting therewith to define a central aperture 10 which extends through the side wall 6 by which means the device may be placed about a pipe 11. The pipe 11 may be connected to a pump or the like (not shown) and extend upwardly from the ground within a tube 12 or the like and on which the device may rest as hereinafter set forth.

The side walls, adjacent the end walls, are provided with bolts 13 which extend across the aperture 10 and have loosely mounted thereon the ends of a pair of jaw members 14, the latter being provided on their under faces, adjacent the bolts 13, with ears or slotted projections 15 slidably receiving therethrough pins 16 for rotating the jaws on the bolts 13. Each of the pins 16 have fixed thereto one end of a crank arm 17, the opposite end of said arm being fixed to a stub shaft 18 journaled for rotation through the side wall 6. The inner face of the side wall 6 is provided with a pair of recesses 19 for receiving the crank 17 therein and out of engagement with the side faces of the jaws. The outer ends of the stub shafts 18 extend beyond the outer face of the side wall 6 and have fixed thereto the ends of links 20, the opposite ends of said links being formed with elongated slots receiving therein pins 21 fixed to the upper end corners of a connecting plate 22, the latter being provided intermediate the lower end corners with a pin 23 journaled for pivoting movement within one end of an operating handle 24.

The operating handle is pivoted, intermediate the ends thereto, to a projecting end of one of the bolts 13 whereby upon movement of the handle the free ends of said jaws will be moved towards and away from the central aperture 10 and the pipe 11 through the medium of the plate 22, links 20, stub shafts 18, crank arm 17 and pins 16. The opposed faces of the free ends of said jaws are of an arcuate configuration and diverge towards the frame in respect to each other. Said opposed faces are fashioned with teeth 25 for effectively gripping and clamping the pipe 11 during the operation of the device. The end wall 8 is fashioned with an outwardly and centrally disposed handle or grip 26 as clearly depicted in the drawing.

In use, the jaws are operated to a raised position through the medium of the handle 24 and the frame is placed about the pipe 11 whereupon the jaws are released and, being of a sufficient weight, gravitate downwardly and engage the outer surface of the pipe through the medium of the teeth 25 as illustrated in Figures 1 and 2. In this position of the parts, the frame resting upon the tube 12, the pipe 11 may be raised upwardly through the jaws, the raising movement of the pipe serving to effect sliding of the jaws therewith during such raising movement. However, upon cessation of the raising movement, the jaws will coact to firmly wedge the pipe therebetween and preclude downward movement of said pipe. Should it be desired to lower the pipe, the handle 15 may be operated sufficiently to effect disengagement of the jaws with the pipe to permit a lowering of the latter.

From the foregoing it will be apparent that I have provided a simple and efficient device wherein pipes or rods may be readily raised and lowered from wells or other similar constructions.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claims.

What I claim is:

1. A device of the character described, comprising, a frame defining a central aperture, jaws pivoted to said frame within said aperture and formed with projections having slots, spaced shafts extending through one side of said frame and each provided with fixed inner and outer arms within and without said frame respectively, pins carried by said inner arms and extending within said slots and slidably engaging said jaws for raising and lowering the latter, a plate slidably and pivotally connecting said outer arms together, and a handle pivoted to said frame and connected to said plate for operating the latter to effect actuation of said jaws.

2. A device of the character described, comprising, a frame defining a central aperture, spaced shafts fixed to said frame and transversing said aperture, jaws pivoted to said shafts within said aperture and fashioned on their under faces with projections formed with slots, a pair of stub shafts extending through one side of said frame, inner and outer arms fixed to the inner and outer ends of said stub shafts respectively, pins carried by said inner arms and extending into said slots for sliding engagement with said jaws whereby to raise and lower the latter, said outer arms formed with slots, a plate equipped with pins extending into said last mentioned slots and connecting said outer arms together, and a handle pivotally mounted on one of said first mentioned shafts and pivotally connected to said plate for operating said arms to effect actuation of said jaws.

WILLIAM N. MEEKS.